Patented Mar. 9, 1943

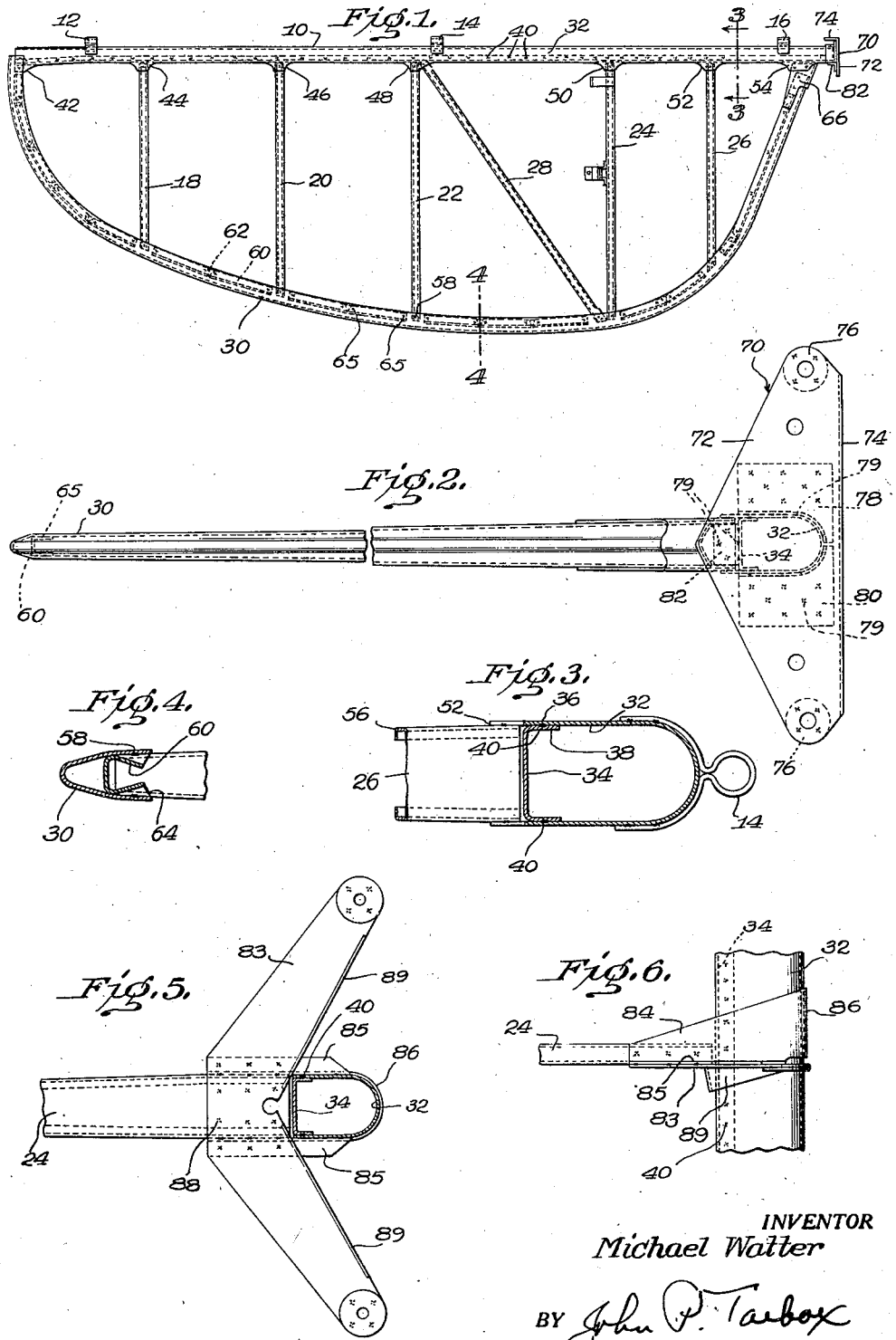

2,313,411

UNITED STATES PATENT OFFICE 2,313,411

AIRCRAFT STRUCTURE

Michael Watter, Philadelphia, Pa., assignor to Edward G. Budd Manufacturing Company, Philadelphia, Pa., a corporation of Pennsylvania Application August 2, 1940, Serial No. 349,726

2 Claims. (Cl. 244—117)

This invention relates to airfoils, and more particularly to a metallic framework therefor especially adapted for use in stabilizers, ailerons, rudders, elevators and the like.

In structures of the type to which the present invention is directed there is generally provided a member extending through the length thereof through which torsion stresses are transmitted to the airfoil section, the member being provided with horns at some point along its length to facilitate rotation of the torsion receiving member. The present invention is directed to an improved construction affording lightness in weight, great resistance to torsion stresses as well as relative thinness of section highly desirable in airfoils of the type suggested.

It is an object of the present invention to improve the torsional strength of the torsion member and to provide in conjunction therewith a novel, yet light, horn member by which, through the use of cables, turning movement of the torsional member may be effected.

Another object of the invention is to provide in conjunction with such a torsional member means for securing an airfoil framework in a light, strong and efficient manner.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

Referring to the drawing wherein like reference characters indicate like parts,

Figure 1 is a top plan view of an elevator assembly frame embodying the features of the present invention.

Figure 2 is an end elevation somewhat enlarged over that of Figure 1 illustrating the torque applying horn.

Figure 3 is a section taken substantially on the line 3—3 of Figure 1 through the torsion member.

Figure 4 is a section taken substantially on the line 4—4 of Figure 1 illustrating the trailing edge construction.

Figure 5 is a modified horn construction adapted for use intermediate the ends of the airfoil structure as when the same is employed in rudder construction.

Figure 6 is a side elevation of Figure 5.

Referring to Figure 1 there is illustrated a torsion tube 10 having hinge loops 12, 14 and 16 for swivelly supporting the torsion tube from an adjacent airfoil. Secured to the torsion tube 10 at spaced intervals are ribs 18, 20, 22, 24, 26 and a diagonal brace 28, the ribs and diagonal brace being adapted to support the formed trailing edge member 30 extending from end to end of the torsion tube 10.

Referring to Figure 3, it will be seen that the torsion tube is composed of a U-section member 32 and a closure or filler channel member 34, the flanges of the U-member 32, namely 36, being secured to the flanges 38 of the filler member 34 in any suitable manner such as by spot welding at closely spaced intervals, a weld being illustrated as at 40. The flanges 36 of the U-section member at spaced points where the ribs 18 to 26 are attached as well as where the trailing edge is attached at the ends are provided with extending portions forming in effect integral gussets as is indicated at 42, 44, 46, 48, 50, 52 and 54 and, as illustrated in Figure 3, the rib members 18 through 26 and diagonal 28 each being composed of a channel member are secured to the projecting integral gusset flange portions 44 through 52, through spot welds extending between the flanges of the rib members 56. The rib members 18 through 26 and diagonal 28 are tapered along their length and secured in the trough formed by the V-section trailing edge member 30 and the flanges 56 are secured to the trailing edge member through suitable spot welds as at 58. The trailing edge is rigidified intermediate the adjacent ribs, and the sections extending from the end ribs to the ends of the torsion member 10, through the insertion of channel members 60 which, because of their failure to bend into a curved outline readily are crimped at intervals as at 62 so as to bend slightly so that they may be secured in place somewhat in the manner of chords, the securing being effected through a series of spot welds 65 between the flanges 64 and the adjacent trailing edge member.

Where the trailing edge member joins with the torque tube at the right-hand end, in order to increase the strength of the joint, a U-section gusset plate 66 is provided which cooperates with the extending portions 54 of the tubular member 10 and the sides of the V-section of the trailing edge. For the purpose of turning the airfoil upon the hinges 12, 14 and 16, a horn member 70 is provided on the end of the tube, the horn member comprising a plate 72 having a stiffening flange 74 and washer reinforcement members 76 at the horn extremities. The horn is secured to the end of the tube through the use of angle members 78, 80 and 82, the members 78 and 80 being secured to the torsion tube 10 and the horn member plate 72 and the bracket 82 being secured to the plate 72 and the filler member 34 preferably through spot welds 79.

In Figures 5 and 6 there is illustrated a slightly modified form of horn member adapted for employment in conjunction with rudders and the like and where the horn member 83 is located at a point away from the end of the airfoil. In such an arrangement the horn member is offset sufficiently to reach around the torque tube and is secured to the torque tube as by spot welding to flanges 85 formed in the edges of a band of metal 84 wrapped around the torque tube as is illustrated at 86. By locating the horn adjacent to any one of the ribs 18 to 26 (24 for example) it may at the same time be welded thereto as at 88. Stiffness of the horn member is obtained through flanges 89.

In assembling the structure described, the torsion tube may be first constructed by welding the filler channel member therewithin. To effect the welds 40, a pair of wedge-shaped copper bars are employed capable of insertion into the hollow space within the finished structure. By moving the wedge-shaped bars relative to one another, they may be jammed against the flanges 38 and 39 of the filler strip 34 and welds effected by forcing a welding electrode against the outside face and establishing a flow of welding current between the welding electrode and the wedge-shaped bars. Should it be desirable to taper the torsion tube, it will readily appear that such wedge shaped bars may automatically compensate for such variation. Subsequently the ribs and trailing edges are assembled preferably by spot welds. For lightness and strength, stainless steel rolled to a tensile strength of 185,000 pounds per square inch may be employed, but the structural features are also applicable to other materials and other fastening means.

Although a single embodiment of the invention, with a modified horn member arrangement has been illustrated and described, it is to be understood that the invention is not to be limited thereto but may be employed in other equivalent mechanical arrangements and forms. As many changes in construction and arrangement may be made without departing from the spirit of the invention as will be apparent to those skilled in the art, reference will be had to the appended claims for a definition of the limits of the invention.

What is claimed is:

1. In an aircraft airfoil having a torque tube, a trailing edge member secured at its opposite ends to said torque tube and a plurality of bracing ribs secured to said torque tube and edge member, a one-piece generally U-shaped member embracing three sides of said torque tube, said member being rigidly secured to said torque tube at opposite sides thereof and having flange portions projecting from said opposite sides, and a flat horn plate having integral portions extending transversely of said airfoil, said flange portions and said integral portions being rigidly secured together.

2. In an aircraft airfoil having a torque tube, a trailing edge member secured at its opposite ends to said torque tube and a plurality of bracing ribs secured to said torque tube and edge member, a one-piece generally U-shaped member embracing three sides of said torque tube, said member being rigidly secured to said torque tube at opposite sides thereof and having flange portions projecting from said opposite sides, and a flat one-piece horn plate disposed adjacent the third side of said torque tube and having its intermediate portion rigidly secured to said flange portions and to one of said ribs.

MICHAEL WATTER.